United States Patent [19]
Haas et al.

[11] 3,842,275
[45] Oct. 15, 1974

[54] LIQUID CRYSTAL IMAGING SYSTEM

[75] Inventors: Werner E. L. Haas, Webster; James E. Adams, Jr., Ontario; John B. Flannery, Jr., Webster, all of N.Y.

[73] Assignee: Xerox Corporation, Stamford, Conn.

[22] Filed: Apr. 26, 1973

[21] Appl. No.: 354,725

[52] U.S. Cl............................ 250/331, 350/160 LC
[51] Int. Cl.............................................. G01t 1/16
[58] Field of Search...................... 250/331, 213 R; 350/160 LC

[56] References Cited
UNITED STATES PATENTS
3,707,322   12/1972   Wysocki et al. ................ 250/213 X
3,732,429   11/1971   Braunstein et al.............. 250/331 X OTHER PUBLICATIONS
Aviram, "Packaging of Liquid–Crystal Displays," IBM Technical Disclosure Bulletin, Vol. 15, No. 2, July 1972, pp. 580–581.

*Primary Examiner*—James W. Lawrence
*Assistant Examiner*—Davis L. Willis
*Attorney, Agent, or Firm*—James J. Ralabate; David C. Petre; Gaetano D. Maccarone

[57] ABSTRACT

An imaging system which utilizes an imaging member comprising a layer of an imaging composition which exhibits the optical properties of the cholesteric liquid crystalline mesophase is disclosed. The imaging member is provided in a light scattering state, imagewise heated above the isotropic transition temperature and allowed to return to a temperature within the mesomorphic temperature range thus resulting in a visible image which typically remains for extended periods of time. The images can be erased and the imaging members reused.

16 Claims, 2 Drawing Figures

LIQUID CRYSTAL IMAGING SYSTEM

BACKGROUND OF THE INVENTION

This invention relates to a liquid crystal imaging system and, more specifically, to an imaging system which employs an imaging member comprising an imaging composition which exhibits the optical properties of the cholesteric liquid crystalline mesophase.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different structures wherein the molecules of the compound are arranged in a molecular structure which is unique to each of the three mesomorphic structures. Each of these structures is well-known in the liquid crystal art.

Some liquid crystalline substances exhibit optically negative characteristics. Birefringence, also referred to as double refraction, is an optical phenomenon characteristic of many solid crystals and all liquid crystal substances. When a beam of unpolarized light strikes a birefringent substance, it is split into two polarized components whose transverse vibrations are at right angles to each other. The two components are transmitted at different velocities through the substance and emerge as beams of polarized light. By the term "optically negative liquid crystalline substances" as used herein, is meant those for which the extraordinary index of refraction $N_E$ is smaller than the ordinary index of refraction $N_O$. Cholesteric liquid crystal substances exhibit this property. For a detailed description of this phenomenon, see *Optical Crystallography*, Wahlstrom, Fourth Edition, Wiley and Sons, Inc., New York.

The molecules in cholesteric liquid crystals are arranged in very thin layers with the long axes of the molecules parallel to each other and to the plane of the layers within each layer. Because of the asymmetry and steric nature of the molecules, the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in *Molecular Structure and the Properties of Liquid Crystals*, G. W. Gray, Academic Press, 1962.

Cholesteric liquid crystals are known to exhibit various observable textures. For example, cholesteric liquid crystals may adopt homeotropic, a focal-conic or a grandjean plane texture as modifications of the cholesteric mesophase itself, as described, for example, in *Molecular Structure and the Properties of Liquid Cyrstals*, supra, pp, 39–54. An imaging system making use of different textures is described in U.S. Pat. No. 3,642,348.

It is also known in the art that the addition of optically active, non-mesomorphic materials to nematic liquid crystalline materials will provide compositions having the optical properties of the cholesteric liquid crystalline mesophase. For example, the article in *Chem. Phys. Letters*, 3, No. 7, 540 (1969) discloses that about 10 percent by weight or less of optically active non-mesomorphic materials such as *l*-menthol and tartaric acid added to nematic liquid crystals provide compositions having the optical properties of the cholesteric liquid crystalline mesophase.

Specifically, with respect to the use of liquid materials in imaging systems, investigation has been made into the optical memory effects of the materials since, as will be clearly apparent to those skilled in the art, the capability of providing an image which can be retained for relatively long periods of time after the image-providing force has been removed from the materials adds another dimension to the imaging system. U.S. Pat. No. 3,642,348 discloses that cholesteric liquid crystalline materials possess memory effects when utilized in an imaging system wherein an electric field is used to provide images on an imaging member comprising cholesteric liquid crystalline material. That mixtures of cholesteric liquid crystalline materials and nematic liquid crystalline materials possess memory effects when utilized in an imaging mode has been disclosed by Heilmeier and Goldmacher in *App. Phys. Letters*, 13, No. 4, 132 (1968). Additionally, French Patent 1.598.439 discloses that compositions having memory effects can be formed by combining nematic liquid crystalline materials with cholesterol, cholesterol derivatives or cholesteric liquid crystals.

Nevertheless, even in view of the body of art which exists, there is often discovered a new mode for applying the known technology. The present invention relates to a novel and advantageous imaging system utilizing liquid crystalline compositions possessing the optical properties of the cholesteric liquid crystalline mesophase and which also possess memory effects when utilized in the system of the invention.

SUMMARY OF THE INVENTION

It is, therefore, an object of this invention to provide a novel liquid crystalline imaging system.

It is a further object of the invention to provide a liquid crystalline imaging system utilizing liquid crystalline compositions having the optical properties of the cholesteric liquid crystalline mesophase.

It is still another object of the invention to provide an imaging system utilizing imaging composition comprising cholesteric liquid crystalline material.

It is yet another object of the invention to provide an imaging system utilizing imaging compositions comprising mixtures of cholesteric and nematic liquid crystalline materials.

Another object of the invention is to provide an imaging system utilizing imaging compositions comprising mixtures of nematic liquid crystalline material and optically active, non-mesomorphic material.

Still further, it is an object of the invention to provide an imaging system which may be operated in a cyclic mode.

It is yet another object of the invention to provide a liquid crystalline imaging system which has optical image storage capability.

The foregoing and other objects and advantages are accomplished in accordance with the invention by providing an imaging composition having the optical properties of the cholesteric liquid crystalline mesophase. The imaging composition is utilized according to the invention, generally speaking, by applying an electric field across a film or layer of the composition to place it in a light scattering state, removing the field, applying imagewise thermal energy or energy which is capable of providing an imagewise thermal effect to the imaging composition layer to heat the image areas thereof above the isotropic transition temperature and allowing the heated portions of the imaging composition layer to return to some temperature within the mesomorphic temperature range of the imaging composition. After cooling, the image and the background portions of the imaging composition layer typically exhibit different diffuse scattering densities thus providing an observable image which may remain for extended periods of time. The image may be erased and the imaging member may be reused.

The novel imaging system of the invention advantageously provides a permanent image (i.e., one which remains for some time after the image forming steps have been completed and the image providing force has been withdrawn from the imaging member) which can be utilized in a number of different modes such as, for example, providing the optical image input for a xerographic reproduction system or to expose a photographic medium thereby leading to the formulation of a hard copy reproduction of the image.

BRIEF DESCRIPTION OF THE DRAWINGS

For a better understanding of the invention as well as other objects and further features thereof, reference is made to the following detailed disclosure of the preferred embodiments thereof taken in conjunction with the accompanying drawings wherein.

DESCRIPTION OF THE PREFERRED EMBODIMENTS

Figure 1:
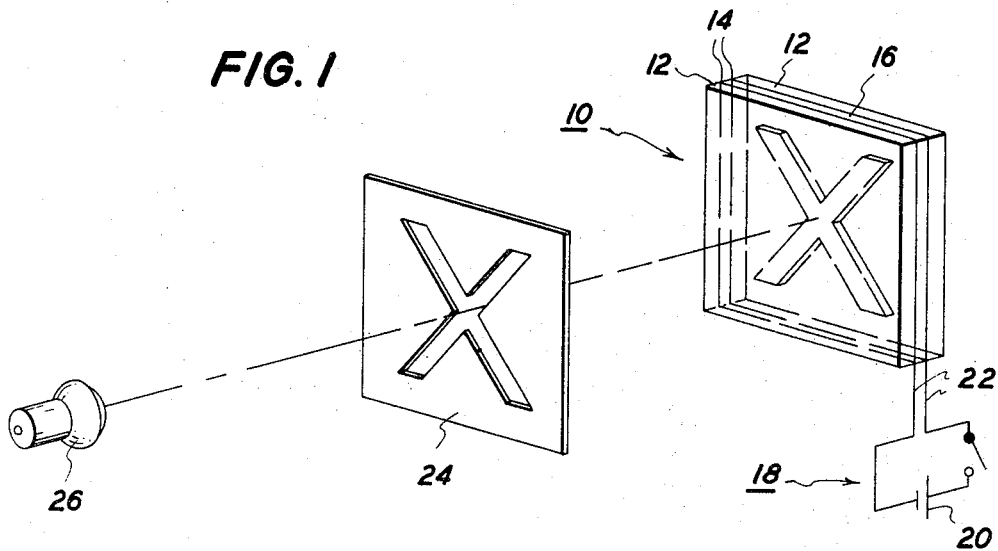
FIG. 1 is a partially schematic, isometric view of an imaging member being imaged according to one embodiment of the novel imaging system.

In FIG. 1 a typical liquid crystalline imaging member, generally designated 10, sometimes referred to as an electroded imaging sandwich, is shown where a pair of transparent plates 12 having substantially transparent conductive coating 14 upon the contact surface comprise a parallel pair of substantially transparent electrodes. An imaging member where both electrodes are transparent is preferred where the imaging member is to be viewed using transmitted light; however, a liquid crystalline imaging member may also be viewed using reflected light thereby requiring only a single transparent electrode while the other may be opaque. The transparent electrodes are separated by spacer member 16 which contains voids which form one or more shallow cups which contain the liquid crystalline film or layer which comprises the active element of the imaging member. The imaging member further includes external circuit 18 which typically comprises a source of potential 20 which is connected across the two electrodes through leads 22. The circuit 18 may also contain suitable switching means. Potential source 20 may be either D.C., A.C. or a combination thereof.

In operation there is applied uniformly across the liquid crystal film an electric field of strength sufficient to place the liquid crystalline imaging composition in a light scattering state. The electric field is removed and the liquid crystal film is imaged by the imagewise application of thermal energy or energy which is capable of providing an imagewise thermal effect in the imaging composition film. One embodiment of the present invention is illustrated in FIG. 1 wherein the imaging composition film is shown being imagewise exposed through a stencil-like mask 24 to thermal radiation which is emitted by source 26. Any source of thermal energy such as, for example, lasers, gas discharge lamps, etc., may be used as the radiation source in the imagewise exposure step. Moreover, in addition to the imagewise mask or stencil exposure system illustrated in FIG. 1, any suitable means of providing an imagewise exposure may be used. Even light pencils or thermal styli are suitable for use in various embodiments of the invention.

In the advantageous system of the present invention, the thermal energy which is applied to the imaging composition film in imagewise configuration is applied in an amount sufficient to heat the imaging composition, in the exposed areas, to a temperature above the isotropic transition temperature of the imaging composition. After the imagewise application of sufficient thermal energy to raise the temperature of the imaging composition in the imagewise exposed areas to a temperature above the isotropic transition temperature, the source of thermal energy is removed and the imaging composition is allowed to return to some temperature within the mesomorphic temperature range.

It is observed that the diffuse scattering density exhibited by the imagewise exposed areas differs from that exhibited by the non-exposed, or background, areas of the imaging composition film. It should be noted that both the image areas and the background areas are in a light scattering state; however, there is an observable difference between the diffuse scattering density exhibited by the respective areas. The image can be viewed in reflection or in transmission both with and without the use of image enhancing means such as polarizers. The images formed in the imaging composition typically remain for an extended period of time, for example, up to a day or more. The image can be erased by applying a D.C. or certain types of A.C. fields as will be described in detail hereinafter.

In the liquid crystal imaging member described in FIG. 1, the electrodes may be of any suitable conductive material. As noted above, the electrodes may both be transparent or one may be opaque. Any suitable conducting material such as, for example, layers of conductive metals may be used for the opaque electrode. Typical suitable transparent conductive electrodes include glass or plastic substrates having substantially transparent and continuously conductive coatings of conductors such as tin, indium oxide, aluminum, chromium, tin oxide or any other suitable conductor. These substantially transparent conductive coatings are typically evaporated onto the more insulating, transparent substrate. NESA glass, a tin oxide coated glass manufactured by the Pittsburgh Plate Glass Company, is a commercially available example of a typical transparent, conductive electrode material.

The spacer member 16 in FIG. 1 which separates the transparent electrodes and contains the imaging composition film between the electrodes is typically chemically inert, substantially insulating and has appropriate dielectric characteristics. Typical suitable spacer materials include, for example, cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate and mixtures thereof. The spacers, which also approximately define the thickness of the imaging composition layer or film are preferably of a thickness in the range of about 250 microns or less, although thicker films can perform satisfactorily according to some embodiments of the inventive imaging system. Optimum results are typically attained with spacer members in the thickness range of about 1 micron to about 50 microns.

The imaging composition film or layer comprises a composition exhibiting the optical properties of the cholesteric liquid crystalline mesophase. The imaging composition typically must possess the property that as a result of being subjected to an electric field (which may be D.C. or A.C.) of sufficient magnitude, e.g., about $10^4$ volts/cm., or above, the composition will adopt a light scattering state and remain in at least a partially light scattering state after removal of the electric field. This property is typically exhibited by liquid crystalline imaging compositions which either have a net negative dielectric anisotropy which is sufficiently large to permit the composition to exhibit the electric field induced dynamic scattering phenomenon; or a sufficiently large net positive dielectric anisotropy such as to allow the composition to undergo the electric field induced Grandjean to focal-conic cholesteric texture transformation. Liquid crystalline materials which exhibit dynamic scattering typically have dielectric anisotropies in the range of from about −0.1 to about −0.5 under operative conditions. Liquid crystalline materials which undergo the electric field induced Grandjean to focal-conic texture transformation typically have dielectric anisotropies of about +0.1 or greater under operative conditions. In general, the net dielectric anisotropy of a mixture is approximately the weighted average of the anisotropies of the individual components. These values, in turn, can be calculated from known molecular structure and, in many cases, are reported in the literature.

The imaging compositions suitable for use according to the inventive system exhibit the optical properties of the cholesteric liquid crystalline mesophase and may be said to fall into several categories, examples of which are: cholesteric liquid crystalline material; mixtures of cholesteric and nematic liquid crystalline materials; mixtures of cholesteric and smectic liquid crystalline materials; mixtures of cholesteric liquid crystalline materials and optically active, non-mesomorphic materials; and mixtures of optically active, non-mesomorphic materials and nematic liquid crystalline materials.

It should be noted that the amounts of the individual components in any suitable composition are controlled, inter alia, by the requirement that the imaging composition must exhibit the optical properties of the cholesteric liquid crystalline mesophase. Furthermore, it should also be noted that the imaging method steps and observed results (i.e., different diffuse scattering densities in the imaged and non-imaged areas of the imaging composition layer) are the same with any of the imaging compositions which may be used according to the inventive system. However, there are differences with respect to the mechanism by which the various imaging compositions are thought to provide the advantageous results of the imaging system. These differences will now be considered to aid those skilled in the art to better understand the invention. It should be understood, however, that there is no intention to limit the invention to any proposed theory of operation.

Generally, in the case of the cholesteric liquid crystalline imaging composition, when the composition is initially placed in the unbiased electroded imaging sandwich shown in FIG. 1, it typically may adopt the Grandjean texture form. The Grandjean texture sometimes referred to as the "disturbed" texture, is typically characterized by selective dispersion of incident light around some wavelength $\lambda_o$ (where $\lambda_o = 2np$ with $n$ representing the index of refraction and $p$, the pitch, or repetition distance, of the helical structure) and optical activity for wavelengths of incident light far from $\lambda_o$. If $\lambda_o$ is in the visible spectrum, the liquid crystalline film appears to have the color corresponding to $\lambda_o$ and if $\lambda_o$ is outside the visible spectrum, the film appears to be colorless and non-scattering. Hence, initially the liquid crystal film in the unbiased imaging sandwich may appear colored or colorless and transparent. When an electric field of sufficient strength is applied uniformly across the liquid crystal film, the liquid crystalline material will be transformed to the focal-conic, or "undisturbed" texture.

The focal-conic texture is also typically characterized by selective dispersion of incident light but, in addition, this texture also exhibits diffuse scattering of visible light whether $\lambda_o$ is in the visible spectrum or outside the visible spectrum. Hence, the imaging composition film is in a light scattering state. For a detailed description of the Grandjean to focal-conic texture trnasformation, see U.S. Pat. No. 3,642,348. When the imaging composition layer is imaged by the imagewise application of thermal energy to heat the exposed portions of the layer above the isotropic transition temperature and then allowed to cool into the cholesteric liquid crystalline mesophase temperature range, the imagewise exposed areas of the imaging composition typically exhibit the focal-conic texture. Thus, it should be noted that both the exposed image areas and the unexposed, or background, areas are now in the focal-conic texture state; however, these respective portions of the imaging composition layer have different diffuse scattering densities and an observer sees an image. The visual difference between the respective areas can be explained in terms of the characteristics of the focal-conic texture state. The focal-conic texture is made up of regions of helical order. The distribution of the helical axes is essentially random in the plane of the layer (see *J. Chem. Phys.*, 50 2,458, 1968). A more complete description of the texture involves a statement regarding the macroscopic distribution of helical axes. Over small regions (on the order of microns), the helical axes are essentially parallel giving rise to a domain-like structure. The size of these domains is a sensitive function of the thermal history of the film. The size of the domains also determines to a large degree the scattering effectiveness of the film. Hence, different portions of the same imaging composition layer may be in the focal-conic texture state yet display visually different diffuse scattering density because of the random distribution of the scattering sites in the liquid crystalline material.

In the case of imaging compositions which comprise a mixture of cholesteric and nematic liquid crystalline materials, the mechanism of operation is dependent upon the particular components used. Again, these imaging compositions are typically colored or colorless and transparent when initially placed in an unbiased imaging sandwich. However, some mixtures of cholesteric and nematic liquid crystalline materials will undergo the Grandjean to focal-conic transition via dynamic scattering in response to an applied electric field whereas other mixtures of these materials undergo the electric field induced Grandjean to focal-conic texture transformation without dynamic scattering. The particular phenomenon exhibited by any particular mixture is a function of the net dielectric anisotropy appropriate to the field strength and frequency of the mixture.

When the thermal energy is applied to the imaging composition layer in imagewise fashion and the layer is allowed to cool as described above, the image, or exposed, areas of the layer will typically adopt the focal-conic texture state and an image will be visually observed. The background areas of the layer have a different diffuse scattering density than the image areas and typically remain in the light scattering state because they are in the focal-conic texture state or because the dynamic scattering phenomenon persists.

In the case of imaging compositions comprising mixtures of nematic liquid crystalline materials and optically active, non-mesomorphic materials, layers of appropriate compositions of this type will exhibit dynamic scattering in response to an applied electric field. When a layer of such imaging composition is subjected to the further method steps of the inventive system, the image, or exposed, areas typically cool to the focal-conic texture state and thus there is provided an observable image since the focal-conic image areas have a different diffuse scattering density than the background areas wherein the dynamic scattering phenomenon continues to be seen.

The imaging composition film or layer may comprise any suitable cholesteric liquid crystal or mixture of cholesteric liquid crystalline materials. Typical suitable cholesteric liquid crystalline materials include derivatives from reactions of cholesterol and inorganic acids, for example: cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl docosonoate; cholesteryl propionate; cholesteryl acetate; cholesteryl valerate; cholesteryl vaccenate; cholesteryl linolate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol, such as cholesteryl decyl ether; cholesteryl lauryl ether, cholesteryl oleyl ether; cholesteryl dodecyl ether; carbamates and carbonates of cholesterol, such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate, cholesteryl-p-nonylphenyl carbonate; cholesteryl-2-(2-ethoxyethoxy) ethyl carbonate; cholesteryl-2-(butoxyethoxy) ethyl carbonate; cholesteryl-1-2-(2-methoxyethoxy) ethyl carbonate; cholesteryl geranyl carbonate; cholesteryl heptyl carbamate; and alkyl amides and aliphatic secondary amines derived from 3 β-amino Δ5-cholestene and mixtures thereof; peptides such as poly-γ-benzyl-$l$-glutamate; derivatives of beta sitosterol, such as sitosteryl chloride; and amyl ester of cyanobenzylideneaminocinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline materials in the advantageous system of the present invention.

In addition to the above cholesteric liquid crystalline materials, the imaging layer may comprise mixtures of cholesteric and nematic liquid crystalline materials. For example, mixtures like cholesteryl chloride: cholesteryl nonanoate: p-azoxyanisole; or cholesteryl chloride: cholesteryl nonanoate: cholesteryl olelyl carbonate: p-azoxyanisole may be used.

Other nematic liquid crystalline materials suitable for use in imaging compositions used in the present imaging system include: p-azoxyanisole, p-azoxyphenetole, p-butoxybenzoic acid, p-methoxycinnamic acid, butyl-p-anisylidene-p'-aminocinnamate, anisylidene-p-aminophenylacetate, p-ethoxybenzylamino-α-methyl-cinnamic acid, 1,4-bis (p-ethoxybenzylidene) cyclohexanone, 4,4'-dihexyloxyazoxybenzene, 4,4'-diheptyloxyazoxybenzene, anisal-p-aminoazobenzene, anisaldazine, α-benzeneazo-(anisal naphthylamine), anisylidene-p-n-butylaniline, p-ethoxybenzylidene-p'-n-butylaniline and mixtures thereof. Members of the stilbene and tolane families of compounds are preferred nematic materials.

Compositions suitable for use in the inventive system may also comprise mixtures of cholesteric liquid crystals and suitable smectic liquid crystalline substances. Typical suitable smectic liquid crystal substance include: n-propyl-4'-ethoxy biphenyl-4-carboxylate; 5-chloro-6-n-heptyloxy-2-naphthoic acid; lower temperature mesophases of cholesteryl octanoate, cholesteryl nonanoate and other open chain aliphatic esters of cholesterol with chain length of 7 or greater; cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl-4-carboxylic acids; ethyl-p-azoxycinnamate; ethyl-p-4-ethoxybenzylideneaminocinnamate; ethyl-p-azoxybenzoate; potassium oleate; ammonium oleate; p-n-octyloxybenzoic acid; the low temperature mesophase of 2-p-n-alkoxybenzylideneaminofluorenones with chain length of 7 or greater; the low temperature mesophase of p-(n-heptyl) oxybenzoic acid; anhydrous sodium stearate; thallium (I) stearate; mixtures thereof and others.

Any suitable optically active, non-mesomorphic material may be used in the imaging compositions employed in the imaging system. As aforesaid, the optically active, non-mesomorphic material can be mixed with suitable nematic liquid crystalline material to form compositions which exhibit the optical properties of the cholesteric liquid crystalline mesophase. These non-mesomorphic materials should typically be substantially completely soluble in the nematic liquid crystalline materials with which they are combined. The imaging compositions typically comprise from about 2 to about 60 percent by weight of the optically active, non-mesomorphic component; broadly, however, the amounts of the respective components present in any imaging composition suitable for use according to the invention are controlled only by the requirement that the imaging composition should exhibit the optical properties of the cholesteric liquid crystalline mesophase. Typical suitable optically active, non-mesomorphic materials include: derivatives of alcohols such as *l*-menthol, *l*-linanool, d-mannitol, d-borneol and d-guercitol; derivatives of ketones such as d-camphor, d-3-methylcyclohexanone, *l*-menthone and *l*-6-isopropyl-3-cyclohexanone; derivates of carboxylic acids such as d-citronellic acid, *l*-citronellic acid, d-chaulmoogric acid, *l*-campholic acid, *l*-arabonic acid, d-tartaric acid and *l*-ascorbic acid; derivatives of aldehydes such as d-citronellal; derivatives of alkenes such as *l*-β-pinene, d-silvesterene, and d-limonene, derivatives of amines such as *l*-2-methylpiperidine; derivatives of nitriles such as d-mandelonitrile; cholesterol and derivatives thereof; and mixtures thereof.

The above lists of materials are not intended to be exhaustive or limiting. The lists disclose a variety of representative materials suitable for use in the imaging compositions which comprise the active element in the present invention. It should be noted, of course, that the imaging compositions which are suitable for use according to the present invention exhibit the requisite properties which make them suitable for use at some specific temperature range which may be at or near room temperature or substantially above or below room temperature. Typically, the imaging method will be carried out at or near room temperature and it is, therefore, preferred to employ imaging compositions which exhibit a liquid crystal state at or near room temperature. Generally, the imaging composition will exhibit the liquid crystalline state at the desired operational temperature. Again, it is noted that the liquid crystal imaging layers or films suitable for use in the invention are preferably of a thickness in the range of about 250 microns or less, although thicker films will perform satisfactorily in some embodiments of the invention. Optimum results are typically achieved using layers in the thickness range of from about 1 micron to about 50 microns.

Mixtures of the liquid crystalline materials and mixtures including the optically active, non-mesomorphic material may be prepared in organic solvents such as chloroform, petroleum ether, methyl ethyl ketone and the like, which are typically subsequently evaporated from the mixture thereby leaving the imaging composition. Alternatively, the individual components of the imaging compositions can be combined directly by heating the mixed components to a temperature which is above the isotropic transition temperature of the liquid crystalline components and the melting point of any non-mesomorphic material.

The images formed in the imaging members according to the invention may be erased, for example, by the application of external forces such as pressure, shearing stresses, electrical fields, magnetic fields and combinations thereof. After the image is erased, the imaging member is typically suitable for reimaging by the present imaging system. In this way imaging members are reusable for large numbers of imaging and erasing cycles. It is preferred to erase the image by applying a D.C. electric field uniformly across the imaging composition layer since it typically causes the layer to be placed in a uniform light scattering state wherein the imaging member is ready for the imaging step. A.C. electric fields having a frequency which either causes the imaging composition layer to exhibit dynamic scattering or otherwise to adopt a uniform focal-conic texture state also provide the same result.

Figure 2:
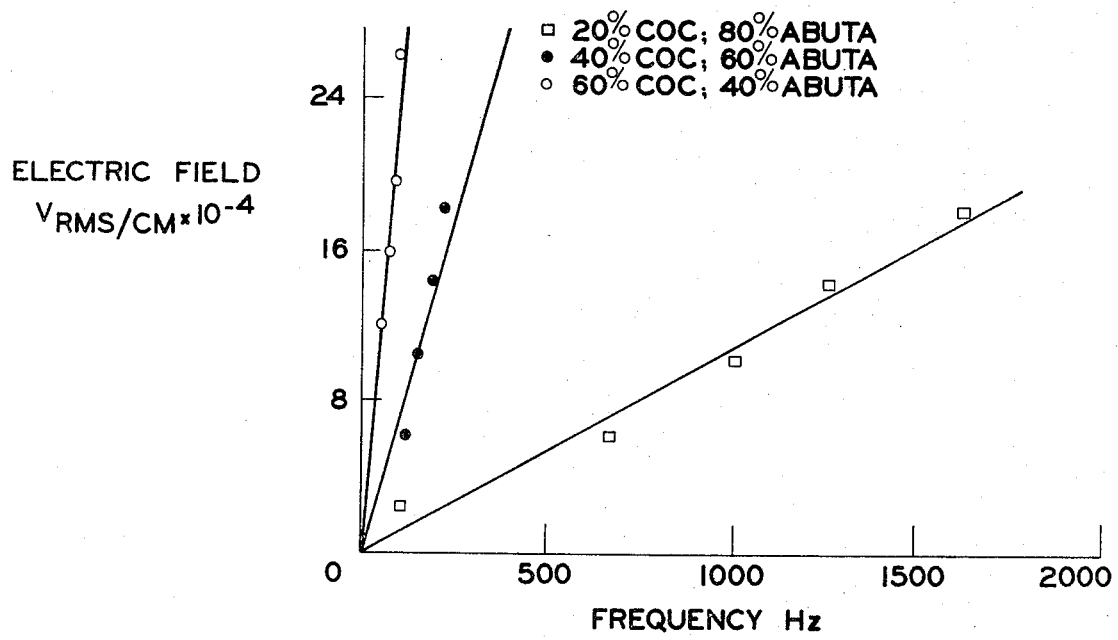
FIG. 2 is a graphical illustration showing the onset of scattering as a function of field and frequency for a specific binary system of varying composition.

FIG. 2 is a graphical plot illustrating the onset of scattering as a function of applied field strength and the frequency for three mixtures of cholesteryl oleyl carbonate (COC) and p-methoxybenzylidene-p'-n-butylaniline (ABUTA). For a detailed disclosure, see *Phys. Review Letters*, 24, 11, pp. 577–578, (1970).

Although the inventive system has been generically described in conjunction with FIG. 1, it should be noted that any suitable means or materials which may combine to effect the desirable result of the inventive system may be used in the various method steps of the inventive system. For example, the means for establishing the uniform electric field across the imaging composition layer to place it in a uniformly light scattering condition may comprise any suitable means. Corona charging means such as are well-known to those in the art may be employed to establish the electric field across the imaging composition layer. In this embodiment the imaging layer would typically be arranged on a conductive layer such as a metallic layer or a transparent electrode. In addition, it is also possible to provide a film of an insulating material such as Mylar, etc., over the imaging layer and establish the electric field across the layer by charging the insulating film.

In addition the means for applying thermal energy to the imaging composition layer in imagewise configuration may comprise any suitable means. For example, as illustrated in FIG. 1, any suitable means for projecting thermal energy 26 through any suitable masking element 24 may be used. For example, a heated stylus, or other heated member itself in the desired image configuration, may be brought into close proximity with the imaging composition layer to provide the advantageous results of the inventive system. A particularly preferred method for thermally imaging in the present system comprises briefly flashing a high energy Xenon flash lamp over an imaging member which is optically masked in the desired image configuration. Other sources of the desired thermal energy may include deflected and modulated lasers or light stylii. In other systems where the imaging composition is used in conjunction with electrically conductive substrates or masks, RF microwave energy inputs may be used to imagewise expose the imaging composition to thermal energy to produce the desired effects.

The imagewise exposed areas of the imaging composition are subjected to energy inputs which are typically in the range of from about 1 to about 100 millijoules/cm$^2$ of imaging surface area, depending upon the thickness of the imaging composition and the proximity of the imaging composition isotropic transition temperature to the initial temperature of the imaging composition. It is noted that the short duration, high intensity flash imaging mode of the present invention is particularly advantageous because of its speed, which limits the time in which lateral thermal conductivity can take place and thereby increases resolution. Of course, prudent selection of imaging compositions and members may help inhibit the lateral thermal conductivity and thereby corresponding enhances resolution. Additionally, radiation absorbing materials such as carbon black may be incorporated in the imaging compositions. Since carbon black absorbs radiation over a wide range of wavelengths, the incorporation of such particles in the layer increases the efficiency of the present method and further provides a wider latitude of choice with respect to the energy sources which can be employed.

It should also be recognized that the temperature conditions under which the present system is to be used may make some imaging compositions preferred for use under certain conditions. For example, when the system is used at room temperature, imaging compositions which exhibit the optical properties of the cholesteric liquid crystalline mesophase at or near room temperature (i.e., from about 20°C to about 30°C) are preferred. In addition, for stability, it is preferred to use imaging compositions whose isotropic transition temperature is sufficiently above the surrounding conditions under which the method is practiced so as to minimize thermal destruction or erasure of the image.

Various preferred embodiments of the novel imaging system will now be described in the following examples, it being understood that these are intended to be illustrative only and the invention is not limited to the materials, conditions, procedures, etc., recited therein. All parts and percentages recited are by weight unless otherwise specified.

EXAMPLE I

An imaging composition made up of equal parts of p-methoxybenzylidene-p'-n-butylaniline (a nematic material) and cholesteryl oleyl carbonate (a cholesteric material) is formed. The composition has an isotropic transition temperature of about 35°C. An approximately 10 micron thick layer of the imaging composition is applied to the tin oxide surface of a NESA glass electrode having a surface area of about 1 square inch. The tin oxide surface of the electrode is connected to one side of a Kepco D.C. power supply. Another NESA glass electrode is placed over the surface of the imaging composition layer and the tin oxide surface of the second electrode is connected to the other side of the power supply.

The imaging composition initially appears colorless. The imaging member is then observed with a Leitz Ortholux Polarizing Microscope. An electric field of about 50 volts is applied across the imaging composition layer and it is observed to become light scattering. The field is then removed from the imaging member. The imaging composition remains in a light scattering state.

A spot of thermal energy from a microscope illuminator is focused on the imaging member with the aid of a condenser for about two seconds. The heated portion of the imaging composition layer is seen to become clear thus indicating that the temperature of this area of the layer is above the isotropic transition temperature of the imaging composition. The illuminator is turned off and the heated portion of the imaging composition is allowed to return to room temperature. The previously heated portion of the imaging composition layer (a dot of approximately 100 micron diameter) is observed to scatter light more densely than the non-heated portions which continue to be light scattering. The image is observable for an extended period up to a day or more.

EXAMPLE II

An imaging composition is formed from about 30 percent cholesteryl chloride, about 56 percent cholesteryl nonanoate and about 14 percent cholesteryl oleyl carbonate. The composition has an isotropic transition temperature of about 57°C. An electroded imaging member with an approximately 20 micron thick layer of the imaging composition is constructed in the manner described in Example I.

An electric field of about 300 volts is established across the imaging composition layer and the layer is seen to become light scattering. A portion of the imaging layer is heated above the isotropic transition temperature as described in Example I and allowed to return to a temperature within the mesomorphic temperature range. The heated and the non-heated areas of the imaging composition are seen to have different diffuse scattering densities.

EXAMPLE III

The procedure described in Example II is repeated with the exception that the thickness of the imaging composition layer in the imaging member is about 60 microns and an electric field of about 1,200 volts is applied across the layer to place it in a light scattering condition. Similar results are obtained.

It will be understood that various other changes in the details, materials, steps and arrangement of elements which have been described herein and illustrated in order to explain the nature of the invention will occur to and may be made by those skilled in the art upon a reading of this disclosure and such modifications are intended to be included within the principle of the invention and the scope of the claims.

What is claimed is:

1. An imaging method comprising the steps of:
   a. prviding a layer of a liquid crystalline imaging composition which exhibits the optical properties of the cholesteric liquid crystalline mesophase and providing said imaging composition at a temperature within its liquid crystalline mesomorphic temperature range;
   b. applying an electric field uniformly across said imaging composition layer of strength sufficient to place said imaging composition in a light scattering state;
   c. removing said electric field and applying energy capable of producing a thermal effect in said imaging composition to said layer in imagewise fashion, wherein the temperature of said imaging composition in portions of said layer receiving said energy is raised above the isotropic transition temperature of said imaging composition; and
   d. cooling the imaged portions of said imaging composition layer to a temperature within the liquid crystalline mesomorphic temperature range of said imaging composition, wherein the imaged portions of said layer assume a light scattering state having a different diffuse scattering density than the background areas of said layer thereby providing a visible image.

2. The method as defined in claim 1 wherein said imaging composition comprises a cholesteric liquid crystalline material.

3. The method as defined in claim 1 wherein said imaging composition comprises a mixture of cholesteric and nematic liquid crystalline materials.

4. The method as defined in claim 1 wherein said imaging composition comprises a mixture of nematic liquid crystalline material and optically active, non-mesomorphic material.

5. The method as defined in claim 1 wherein said layer of imaging composition is provided on a supporting substrate.

6. The method as defined in claim 1 wherein said layer of imaging composition is of a thickness not greater than about 250 microns.

7. The method as defined in claim 6 wherein said layer of imaging composition is of a thickness of from about 1 to about 50 microns.

8. The method as defined in claim 7 wherein the energy applied to the layer of imaging composition is in the range of from about 1 millijoule/cm$^2$ to about 100 millijoules/cm$^2$ of surface area.

9. The method as defined in claim 8 wherein said imaging composition layer is provided between a pair of electrodes at least one of which is transparent and wherein step (b) is carried out by establishing an electrical field between said electrodes.

10. The method as defined in claim 9 wherein the energy is applied by exposing the layer of imaging composition to energy through a mask in image configuration.

11. The method as defined in claim 10 wherein the source of said energy is a gas discharge lamp.

12. The method as defined in claim 9 wherein the source of said energy is a laser.

13. The method as defined in claim 1 and further including the step (e) of erasing said image by applying an external force to said imaging composition layer.

14. The method as defined in claim 13 wherein said step (e) of erasing comprises applying a D.C. electric field uniformly across said imaging composition layer, said electric field being of strength sufficient to place said layer in a uniformly light scattering state.

15. The method as defined in claim 14 and further including repeating steps (c) through (e) at least one additional time using the same imaging composition layer.

16. The method as defined in claim 1 wherein said electric field in step (b) has a strength of at least $10^4$ volts/cm of thickness of said layer of liquid crystal composition.

* * * * *